United States Patent

Woodruff et al.

[15] 3,686,393

[45] Aug. 22, 1972

[54] METHOD FOR INHIBITING DENTAL PLAQUE

[72] Inventors: Harold Boyd Woodruff, Watchung; Thomas H. Stoudt, Westfield, both of N.J.

[73] Assignee: Merck & Co., Inc., Rahway, N.J.

[22] Filed: Feb. 12, 1970

[21] Appl. No.: 10,983

Related U.S. Application Data

[63] Continuation-in-part of Ser. No. 838,864, July 2, 1969, abandoned, which is a continuation-in-part of Ser. No. 701,875, Jan. 31, 1968, abandoned, which is a continuation-in-part of Ser. No. 656,671, July 28, 1967, abandoned.

[52] U.S. Cl....................................................424/50
[51] Int. Cl..............................................A61r 7/16
[58] Field of Search................................424/50, 94

[56] References Cited

UNITED STATES PATENTS 3,194,738  7/1965  Harrisson et al............424/50

FOREIGN PATENTS OR APPLICATIONS 941,664  11/1963  Great Britain

OTHER PUBLICATIONS

Gibbons et al., Archs. Oral. Biol. Vol. 12, pages 11–24 January 1967

*Primary Examiner*—Richard L. Huff
*Attorney*—Raymond Underwood, Harry E. Westlake, Jr. and I. Louis Wolk

[57] ABSTRACT

The enzyme dextranase is applied to the teeth and gums to eliminate or suppress plaque formation.

5 Claims, No Drawings

METHOD FOR INHIBITING DENTAL PLAQUE

This application is a continuation-in-part of Ser. No. 838,864, filed July 2, 1969, which is a continuation-in-part of Ser. No. 701,875, filed Jan. 31, 1968, which in turn is a continuation-in-part of Ser. No. 656,671, filed July 28, 1967, all now abandoned.

This invention relates to oral medicinal preparations and to compositions to prevent or reduce dental and gingival plaque formation. These compositions are therefore useful in reducing the incidence of dental caries and maintaining improved oral hygiene which is an important factor in the control of periodontal disease.

It has been said that dental caries is perhaps the most prevalent disease of man and this may be true because of a large number of teeth and the consequent numerous loci for caries formation. Aside from the primary loss of tooth structure, the aftermath of the process brings into play many secondary complications such as necessary removal of the tooth, impared mastication, alterations in the periodontium, and infections of the pulp and periaphical tissue. Also, early periodontal disease often correlates with a relatively high incidence of dental caries.

A close correlative relationship has been found to exist between the occurrence of dental plaque and caries. The longer dental plaque is allowed to remain on the teeth, the more likely is the formation of cavities beneath the plaque. Also, plaque on the teeth is known to calcify and irritate adjacent gum tissue and to cause gingival diseases.

The removal of dental plaque is consequently important in oral hygiene as it reduces the incidence of caries. The gingival tissue also is cleared of an irritant which plays a role in the etiology of periodontal disease. Plaque formation on dentures often has an objectionable staining effect and can be odorous.

In accordance with the present invention it has been found that dextranases from the sources hereinafter described eliminate or attack formed dental plaque and also are effective in preventing or retarding dental plaque formation. The general use of this enzyme for this purpose is disclosed in our Belgium Pat. No. 718,645 which is hereby incorporated herein by reference; the Belgium patent is based in part on our U.S. applications Ser. Nos. 656,671, 701,875 and 838,864. As is pointed out in this Belgium patent, dextranases are elaborated by many micro-organisms undergoing fermentation and this name is derived from their exceptional ability to digest or liquify dextran.

There are numerous literature references to the different sources of dextranases and to the widespread differences in the dextranases. One such reference is an article by H. M. Tsuchiya et al, [Tsuchiya, H.M., Jeannes, A., Bricker, H.M. and Wilham, C. A. 1952 Dextran-degrading enzymes from molds, J. Bact. 64. 513–519 (1952)], including the bibliography of references at the end thereof. These different dextranases can be expected to have varying utility and some are more effective than others to treat dental plaque.

The present invention involves the discovery that dextranases which are elaborated by the following organisms in the culture collection of the U.S. Department of Agriculture Laboratories in Peoria, Ill., are especially effective:

*Penicillium funiculosum* NRRL 1132
*Penicillium funiculosum* NRRL 1768
*Penicillium lilacinum* NRRL 896
*Penicillium verruculosum* NRRL 2135
Fungal Isolate NRRL 3673

The dextranase-containing fermentation broths are prepared from these organisms by using the techniques described by Tsuchiya et al., mentioned above. This process is generally described in the Tsuchiya et al. article in the following sentences, The molds were usually grown in 100 ml. of culture in 1 liter Erlenmeyer flasks at 30° C on a reciprocating shaker. The media used for the propagation of the molds and the production of the enzyme contained dextran and corn steep liquor solids. The latter was selected as the source of nitrogen and the necessary growth factors since preliminary experiments showed it to be equal to yeast extract and superior to malt extract and liver extract as a supplement for the production of the enzyme. Although preliminary work indicated that the enzymic activity in culture filtrates increased up to the ninth day, substantially all of the enzyme had been elaborated by the fifth. Therefore, an incubation period of 5 days was used throughout this investigation. Any commercially obtainable dextran may be used but the dextran used in the preparation of this fermentation process was obtained from the Commercial Solvents Corporation as "-high molecular weight dextran" from the bacterium *Leuconostac mesenteroides*. Using the assay procedure described by Tsuchiya et al. as well as their measure of enzyme activity (one unit equals the enzyme activity which produces 1 mg. equivalent of isomaltose monohydrate in 1 hour at 40°C), the mold NRRL 1768 was found to produce the highest specific activity. An analysis of it showed that it had the following properties:

1. Molecular Weight of 41,000
   based on: gel filtration on polyacrylamide gels Bio-Gel P-100 and P-150.
2. Isoelectric Point
   a. Major Peak = pH 4.6 (pure dextranase) based on: electrofocusing column containing Ampholite in the buffer range of pH 4 to pH 6, run at 5°C for 4 days at 1000V (DC).
3. Gel Electrophoresis (discontinuous)
   Dextranase $R_f = 0.45$ based on: Run in 7% Cyanogum CN41 at pH 8.9 with 0.37M Tris HCl buffer. Current at 5MA per tube and run stopped when Brom Phenol Blue marker ($R_f = 1.0$) reached near bottom of gel.
4. Ultra Violet Absorption
   Pure dextranase UV peak at 280 nm – $E_1^{1\%} cm = 20$.
5. Ultra Centrifugation
   Sedimenting rate = 4.7 Svedberg units (run at 0.2 mg per ml. – 20°C 52,000 rpm.)
6. Composition
   a. Nitrogen Content = 16%
   b. Amino Acid Analysis (Spinco) - Mostly aspartic acid (approx. 15%), serine and glycine.
7. Assay
   One mg. of dextranase incubated with dextran at 40°C for 2 hours in pH 5.2 acetate buffer gives the following amount of isomaltose reducing equivalents:
   Substrate: Sigma Co. Dextran (M.W. = 155,000)– 27,000 isomaltose units/mg. dextranase Nutritional Biochemical Co. Dextran (M. W. 100,000–200,000–35,000 isomaltose units/mg. dextranase.

A normal level of activity obtained in the fermentation broth is 100-2000 units per milliliter. Filtration (to separate the mycelium from the enzyme), then concentration, ammonium sulfate precipitation of a concentrated solution followed by dialysis to remove inorganic salts and dialyzable materials, and finally lyophilization produces a solid with an activity of 100-500,000 units in each milligram of dry powder. Standard chromatographic procedures produce material with higher specific activity.

The dextranase obtained from the above organisms and procedures is applied to the teeth by incorporating it in a preparation to be taken into the mouth. This may be a toothpaste, a mouthwash, a rubbing ointment, a chewing gum, a food, a beverage or a high velocity jet stream of water to clean the teeth. A preferred single dosage application should utilize a dextranase which has been purified so as to assay from 100 to 500,000 units of dextranase per milligram of dry preparation. This purified dextranase may be directly applied but it preferably is diluted by incorporating it in a carrier as mentioned above and from 1,000 to 200,000 units of dextranase would be used per dosage application and several applications spaced over the day are desirable. The normal application time of these carriers will satisfy the requirements of contact time for the enzyme but a longer period will be beneficial. For example, after using a mouthwash the mouth should not be rinsed out with clear water.

The base or carrier which is employed, such as the toothpaste and the other mentioned above may be of conventional nature except that any dextranase destroying or inhibiting agents should not be present. Other therapeutic agents such as fluorides may be included in the preparations.

Representative examples of the invention, using a dextranase having the properties listed above, are:

EXAMPLE 1

Toothpaste or Tooth Powder: Accepted formulations of the kind to be found in text books or on the market are supplemented with 100-200,000 units of dextranase enzyme per gram of the formulation. This would be used in the normal manner on a tooth brush.

EXAMPLE 2

Rubbing Ointment or Lotion: Accepted formulations of the kind to be found in text books or on the market are supplemented with 100-200,000 units of dextranase enzyme per gram of the formulation. This would be applied to the teeth and gums as with the fingers.

EXAMPLE 3

Mouthwash: Accepted formulations of the kind to be found in text books or on the market are supplemented with dextranase concentrations of 100-50,000 units per milliliter of the formulation. This would be swished about in the mouth in the usual manner.

EXAMPLE 4

Chewing Gum: Accepted formulations of the kind to be found in text books or on the market are supplemented with 100-50,000 units of dextranase enzyme per gram of the formulation. As an ordinary chewing stick weight about 4 grams, a stick containing 5,000 units would have an enzyme content of about 0.004 percent by weight. A chewing gum stick, for instance, would be chewed in the usual manner. In like manner, a lozenge or a chewable tablet could be made up.

EXAMPLE 5

Food: As large amounts of food are generally consumed, from 10-50,000 units of dextranase enzyme would be added to a gram of the food such as breakfast cereal and breads for example.

Other examples of especial value are the addition of the enzyme to foods containing high amounts of sucrose such as ordinary candy and ice cream. Mastication in the usual manner applies the enzyme to the teeth and gums.

EXAMPLE 6

Beverages: The enzyme can be added to drinking water or milk but it is of especial value in sucrose containing beverages such as cola, orange and the like flavored drinks containing sucrose and/or artificial sweeteners. It would be added in the amount of 10 to 50,000 units of the dextranase enzyme per milliliter of a conventional cola drink. This would apply to the gums and teeth, in the drinking act, an amount of the enzyme equivalent to that from chewing a stick of gum of Example 4, for example.

EXAMPLE 7

Jet-stream teeth cleaner: To the water to be used in the conventional apparatus to deliver a high-velocity jet of water on the teeth to clean teeth, is added dextranase in the amount of 10-50,000 units per ml. solution.

A preparation similar to that of Example 1 was tested in in vivo experiments. They included the use of dextranase obtained from the following organism and an observation of its activity on dental plaques induced by the following organisms. In vivo tests showing that this dextranase has significant activity against in vivo dental plaques, are reported in an article entitled "The effects of a dextranase preparation on plaque and caries in hamsters, a preliminary report", by R. J. Fitzgerald et al, in J.A. Dental Assn. 76, No. 2, 301–304, Feb. 1968. A summary of this is included in the following table.

| Dextranase producing organism | Plaque producing organism |
|---|---|
| P. funiculosum NRRL 1768 | Hamster strain E-49 |
| P. funiculosum NRRL 1768 | Human strain 6715 |
| P. funiculosum NRRL 1768 | Human strain SL-1 |

The plaque producing organisms in the Table are ones which are known to be especially causative of this condition. They are referred to in the article "Enzymatic Removal of Artificial Plaques" by R. J. Fitzgerald et al; in Archs. oral Biol, 13, 125–128, 1968.

WHAT IS CLAIMED IS:

1. The method of eliminating dental plaque formation which comprises applying to teeth having plaque thereon, per unit dosage, from 1,000 to 200,000 units of dextranase produced by growing P. funiculosum NRRL 1132 in a fermentation broth therefor at a suitable temperature for a suit-able period of time and separating therefrom an enzyme having from 100 to 2000 dextranase units of activity per milliliter of the fermentation broth.

2. The method of eliminating dental plaque formation which comprises applying to teeth having plaque thereon, per unit dosage, from 1,000 to 200,000 units of dextranase produced by growing *P. funiculosum* NRRL 1768 in a fermentation broth therefor at a suitable temperature for a suitable period of time and separating therefrom an enzyme having from 100 to 2,000 dextranase units of activity per milliliter of the fermentation broth.

3. The method of eliminating dental plaque formation which comprises applying to teeth having plaque thereon, per unit dosage, from 1,000 to 200,000 units of dextranase produced by growning *P. funiculosum* NRRL 896 in a fermentation broth therefor at a suitable temperature for a suitable period of time and separating therefrom an enzyme having from 100 to 2,000 dextranase units of activity per milliliter of the fermentation broth.

4. The method of eliminating dental plaque formation which comprises applying to teeth having plaque thereon, per unit dosage, from 1,000 to 200,000 units of dextranase produced by growing *P. funiculosum* NRRL 2135 in a fermentation broth therefor at a suitable temperature for a suitable period of time and separating therefrom an enzyme having from 100 to 2,000 dextranase units of activity per milliliter of the fermentation broth.

5. The method of eliminating dental plaque formation which comprises applying to teeth having plaque thereon, per unit dosage, from 1,000 to 200,000 units of dextranase produced by growing Fungal Isolate NRRL 3673 in a fermentation broth therefor at a suitable temperature for a suitable period of time and separating therefrom an enzyme having from 100 to 2,000 dextranase units of activity per milliliter of the fermentation broth.

* * * * *